(12) United States Patent
Han et al.

(10) Patent No.: US 12,447,724 B2
(45) Date of Patent: *Oct. 21, 2025

(54) MOISTURE AND OXYGEN BARRIER LAMINATE

(71) Applicant: KOLON INDUSTRIES, INC., Seoul (KR)

(72) Inventors: Jae Il Han, Seoul (KR); Chang Won Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 190 days.

This patent is subject to a terminal disclaimer.

(21) Appl. No.: 18/253,646

(22) PCT Filed: Dec. 23, 2021

(86) PCT No.: PCT/KR2021/019725
§ 371 (c)(1),
(2) Date: May 19, 2023

(87) PCT Pub. No.: WO2022/154305
PCT Pub. Date: Jul. 21, 2022

(65) Prior Publication Data
US 2024/0009978 A1    Jan. 11, 2024

(30) Foreign Application Priority Data

Jan. 13, 2021 (KR) ........................ 10-2021-0004783

(51) Int. Cl.
| | | |
|---|---|---|
| *B32B 27/08* | (2006.01) | |
| *B32B 7/12* | (2006.01) | |
| *B32B 27/32* | (2006.01) | |
| *B32B 27/34* | (2006.01) | |
| *B32B 27/36* | (2006.01) | |
| *C08J 5/18* | (2006.01) | |
| *C08J 7/048* | (2020.01) | |

(52) U.S. Cl.
CPC ................ *B32B 27/08* (2013.01); *B32B 7/12* (2013.01); *B32B 27/32* (2013.01); *B32B 27/34* (2013.01); *B32B 27/36* (2013.01); *C08J 5/18* (2013.01); *C08J 7/048* (2020.01); *B32B 2250/03* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/7244* (2013.01); *B32B 2307/7246* (2013.01); *B32B 2307/734* (2013.01); *B32B 2307/7376* (2023.05); *B32B 2307/748* (2013.01); *B32B 2439/70* (2013.01); *C08J 2367/02* (2013.01)

(58) Field of Classification Search
None
See application file for complete search history.

(56) References Cited

U.S. PATENT DOCUMENTS

2017/0036833 A1    2/2017    Takeuchi

FOREIGN PATENT DOCUMENTS

| | | |
|---|---|---|
| JP | 2005-097560 A | 4/2005 |
| JP | 2005178805 A | 7/2005 |
| JP | 2007290292 A | 11/2007 |
| JP | 2020-049942 A | 4/2020 |
| KR | 20200135828 A | 12/2020 |
| KR | 102326010 B1 | 11/2021 |
| WO | 2015-163413 A1 | 10/2015 |
| WO | 2017-065264 A1 | 4/2017 |
| WO | 2018110272 A1 | 6/2018 |
| WO | 2019-021759 A1 | 1/2019 |
| WO | 2020031712 A1 | 2/2020 |

OTHER PUBLICATIONS

International Search Report Dated Jul. 21, 2022.

*Primary Examiner* — Samir Shah
(74) *Attorney, Agent, or Firm* — Harvest IP Law, LLP

(57) ABSTRACT

The present invention relates to a moisture and oxygen barrier laminate including an inorganic barrier layer and a protective layer sequentially formed on one surface of a light-transmitting substrate, and having a particular change in water vapor transmission rate before and after retort processing or before and after tests via Gelbo flex tester.

14 Claims, No Drawings

MOISTURE AND OXYGEN BARRIER LAMINATE

FIELD OF THE INVENTION

Cross-Reference to Related Application(S)

This application is a National Stage of International Application No. PCT/KR2021/019725 filed on Dec. 23, 2021 claiming the benefit of Korean Patent Application No. 10-2021-0004783 filed on Jan. 13, 2021 with the Korean Intellectual Property Office, the disclosure of which is incorporated herein by reference in its entirety.

The present invention relates to a moisture and oxygen barrier laminate.

BACKGROUND OF THE INVENTION

A barrier laminate in which an inorganic thin film of aluminum oxide or the like is formed on the surface of a plastic substrate is applied for packaging purpose of various articles such as foods and electronic devices.

In particular, the barrier laminate for food packaging has a problem that barrier properties deteriorate due to separation or cracking between layers when deformation such as bending or a retort processing for sterilizing food at a high temperature is applied.

Therefore, there is a need for a laminate that can maintain excellent barrier properties even when as retort heat processing or deformation such as bending is applied.

SUMMARY OF THE INVENTION

Technical Problem

An object of the present invention is to provide a barrier laminate having excellent water and oxygen vapor transmission rate even after a retort processing or a Gelbo flex test which sterilizes food at a high temperature.

Technical Solution

Hereinafter, a moisture and oxygen barrier laminate according to an embodiment of the present invention will be described.

Unless defined otherwise, all technical and scientific terms used herein have the same meaning as commonly understood by one of ordinary skill in the art to which this invention belongs. The terms used herein are for the purpose of describing specific embodiments only and is not intended to limit the scope of the invention.

The singular forms "a," "an" and "the" used herein are intended to include plural forms, unless the context clearly indicates otherwise.

It should be understood that the terms "comprise," "include", "have", etc. are used herein to specify the presence of stated feature, region, integer, step, action, element and/or component, but do not preclude the presence or addition of one or more other feature, region, integer, step, action, element, component and/or group.

While the present invention can be modified in various ways and take on various alternative forms, specific embodiments thereof are illustrated and described in detail below. However, it should be understood that there is no intent to limit the present invention to the particular forms disclosed, but on the contrary, the present invention covers all modifications, equivalents, and alternatives falling within the spirit and scope of the present invention.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items.

According to one embodiment of the present invention, there is provided a moisture and oxygen barrier laminate, comprising: an inorganic barrier layer and a protective layer sequentially formed on one surface of a light-transmitting substrate, wherein the change in water vapor transmission rate (WVTR) before and after retort processing at a temperature of 135° C. for 1 hour is 1.00 g/m²*day or less.

However, the present inventors have conducted intensive research, and as a result, found that when a moisture and oxygen barrier laminate comprises an inorganic barrier layer and a protective layer sequentially formed on one surface of a light-transmitting substrate, wherein the change in water vapor transmission rate (WVTR) before and after retort processing at a temperature of 135° C. for 1 hour is 1.00 g/m²*day or less, 0.80 g/m²*day or less, 0.60 g/m²*day or less, 0.50 g/m²*day or less, or 0.01 to 0.40 g/m²*day, it maintains high water and oxygen vapor transmission rates even after performing the Gelbo flex test as well as the retort processing which sterilizes food at high temperature, and exhibits excellent interlayer adhesion.

In addition, according to another embodiment of the present invention, there is provided a moisture and oxygen barrier laminate, comprising: an inorganic barrier layer and a protective layer sequentially formed on one surface of a light-transmitting substrate, wherein the change in water vapor transmission rate (WVTR) before and after 50 cycles of repeated twisting using a Gelbo flex tester is 0.70 g/m²*day or less.

The change in water vapor transmission rate (WVTR) before and after 50 cycles of repeated twisting of the moisture and oxygen barrier laminate using a Gelbo flex tester may be 0.70 g/m²*day or less, 0.68 g/m²*day or less, 0.65 g/m²*day or less, or 0.01 to 0.62 g/m²*day. In addition, since such a water vapor transmission rate is satisfied, the water and oxygen vapor transmission rates are maintained high even after performing the Gelbo flex test, and excellent interlayer adhesion can be exhibited.

In addition, the change in oxygen transmission rate (OTR) before and after retort processing of the moisture and oxygen barrier laminate at a temperature of 135° C. for 1 hour may be 0.50 cc/m²*day or less, 0.40 cc/m²*day or less, 0.30 cc/m²*day or less, or 0.01 to 0.25 cc/m²*day.

The change in oxygen transmission rate (OTR) before and after 50 cycles of repeated twisting of the moisture and oxygen barrier laminate using a Gelbo flex tester may be 1.00 cc/m²*day or less, 0.90 cc/m²*day or less, 0.80 cc/m²*day or less, 0.70 cc/m²*day or less, or 0.01 to 0.65 cc/m²*day.

Since the moisture and oxygen barrier laminate satisfies the above-mentioned numerical range, even after performing the retort process and Gelbo flex test for sterilizing food at high temperature, it can maintain high water and oxygen vapor transmission rates and exhibit excellent interlayer adhesion.

The change in the oxygen vapor transmission rate and the water vapor transmission rate can may be controlled by the type of light-transmitting substrate, in-plane retardation (Re), shrinkage, composition of the protective layer, and the like, but is not limited thereto.

In addition, the retort processing may be performed by, for example, a method of sterilizing at 135° C. for 1 hour using a retort evaluation equipment (PRS-03-IH, Kyunghan Co., Ltd.).

Further, the Gelbo flex test can be performed according to the standard test method of ASTM F392 using a Gelbo flex tester (model name: G0005, manufacturer: IDM Instruments). For example, the moisture and oxygen barrier laminates are attached to the mandrels of a Gelbo flex tester, the test setup gives a twisting motion of 440° in the first 90 mm of the stroke, and is followed by a straight horizontal motion of mm. The speed of the bending motion is set to 50 cycles per minute, and strokes can be made at 50 cycles.

Furthermore, the water vapor transmission rate before and after the retort processing and the Gelbo flex test can be measured under the conditions of 40° C. and 90% relative humidity according to the standard test method of ASTM F1249 using a water vapor permeation analyzer (model name: AQUATRAN 2 WVTR Analyzer, manufacturer: Mocon Inc.).

Further, an oxygen vapor transmission rate before and after the retort processing and the Gelbo flex test can be measured under the conditions of 23° C. and 0% relative humidity according to the standard test method of ASTM D3985 using an oxygen permeation analyzer (model name: OX-Tran 2/21 OTR Analyzer, manufacturer: Mocon Inc.).

The moisture and oxygen barrier laminate according to one embodiment of the present invention may have a structure including an inorganic barrier layer and a protective layer sequentially formed on one surface of a light-transmitting substrate.

Further, the moisture and oxygen barrier laminate may have a structure including an inorganic barrier layer and a protective layer respectively sequentially formed on both surfaces of the light-transmitting substrate.

The light-transmitting substrate included in the moisture and oxygen barrier laminate according to one embodiment of the present invention may be a plastic film having transparency and flexibility.

The light-transmitting substrate may have a transmittance of 50% or more, 70% or more, 80% or more, or 90% or more at a wavelength of 300 nm or more.

Specifically, the light-transmitting substrate may be a plastic film including at least one polymer selected from the group consisting of polyethylene terephthalate (PET), polyethylene naphthalate (PEN), polybutylene terephthalate (PBT), cycloolefin polymer (COP), cycloolefin copolymer (COC), polycarbonate (PC), and poly(methyl methacrylate) (PMMA).

Among them, the polyethylene terephthalate film is excellent in strength while having both transparency and flexibility, and thus can be suitably applied as the light-transmitting substrate.

The polyethylene terephthalate film may have, for example, an in-plane retardation (Re) value of 120 to 300 nm, 130 to 280 nm, 140 to 250 nm, or 150 to 200 nm. If the polyethylene terephthalate film does not satisfy the above-mentioned in-plane retardation value, the properties of water vapor transmission rate, oxygen transmission rate, and adhesive strength of the laminate after performing the retort processing or the Gelbo flex test may be rapidly deteriorated.

The polyethylene terephthalate film may have, for example, a thickness direction retardation ($R_{th}$) value of 100 nm or more and 1,000 nm or less, 200 nm or more and 800 nm or less, 300 nm or more and 700 nm or less, 400 nm or more and 600 nm or less. If the polyethylene terephthalate film does not satisfy the above-mentioned retardation value in the thickness direction, the properties of water vapor transmission rate, oxygen transmission rate, and adhesive strength of the laminate after performing the retort processing or the Gelbo flex test may be rapidly deteriorated.

The retardation can be calculated by substituting a refractive index ($n_x$) in the slow axis direction, which is the direction in which the refractive index is the largest in the plane of the polyethylene terephthalate film, a refractive index ($n_y$) in the fast axis direction, which is a direction orthogonal to the slow axis direction, a refractive index ($n_z$) in the thickness direction of polyethylene terephthalate film and a thickness d (unit: nm) of the polyethylene terephthalate film into the following Equations 1 and 2, respectively.

$$Re=(n_x-n_y)\times d \quad \text{[Equation 1]}$$

$$R_{th}=(n_z-n_y)\times d \quad \text{[Equation 2]}$$

In addition, such a retardation may be, for example, a value measured using a retardation measuring device (KOBRA-WPR, measuring wavelength: 590 nm).

Alternatively, two axial refractive indices ($n_x$, $n_y$) provided in the direction of the alignment axis of the polyethylene terephthalate film and orthogonal to the direction of the alignment axis are obtained using an Abbe type refractometer (NAR-4T). At this time, an axis showing a larger refractive index is defined as a slow axis. In addition, the thickness of the polyethylene terephthalate film is measured using, for example, an electric micrometer, and a refractive index difference ($n_x-n_y$) is calculated using the previously obtained refractive index, and the retardation (Re) can be obtained from the product of this refractive index difference ($n_x-n_y$) and the thickness d (nm) of a polyethylene terephthalate film.

A refractive index difference ($n_x-n_y$) of the polyethylene terephthalate film may be to 0.030, 0.013 to 0.028, or 0.015 to 0.025. If the polyethylene terephthalate film does not satisfy the above-mentioned refractive index difference ($n_x-n_y$), the properties of water vapor transmission rate, oxygen transmission rate, and adhesive strength of the laminate after performing the retort processing or the Gelbo flex test may be rapidly deteriorated.

Further, such a retardation can be obtained by cutting the polyethylene terephthalate film into a band-shaped test piece of the length full width in the width direction (TD), and then measuring the in-plane retardation (Re) and the thickness direction retardation ($R_{th}$) at 550 nm at 10 measurement points with intervals of 100 mm in the width direction, respectively.

At this time, the average value of the in-plane retardation (Re) measured at intervals of 100 mm in the width direction with respect to the polyethylene terephthalate film may be 120 to 300 nm, 130 to 280 nm, 140 to 250 nm, or 150 to 200 nm. The standard deviation of the in-plane retardation (Re) measured at each of the above-mentioned measurement points may be 7.0 to 15.0, 8.0 to 14.0, 9.0 to 12.0, 9.5 to 11.0, or 10.0 to 10.3.

Further, the average value of the retardation ($R_{th}$) in the thickness direction measured at intervals of 100 mm in the width direction with respect to the polyethylene terephthalate film may be 200 nm or more and 900 nm or less, 300 nm or more and 800 nm or less, 350 nm or more and 600 nm or less, 400 nm or more and 550 nm or less. Moreover, the standard deviation of the retardation ($R_{th}$) in the thickness direction measured at each of the above-mentioned measurement points may be 10.0 to 40.0, to 35.0, 20.0 to 30.0, or 25.0 to 30.0.

On the other hand, the polyethylene terephthalate film has a shrinkage in the machine direction (MD) of 0.5% to 2.0%, 0.7% to 1.8%, or 1.0% to 1.5%, which is measured according to ASTM D 2305 after maintaining at 150° C. for 30 minutes. In addition, the shrinkage in the width direction TD may be 0.0% to 1.0%, 0.0% to 0.8%, or 0.0% to 0.5%.

If the polyethylene terephthalate film does not satisfy the above-mentioned shrinkage in the machine direction (MD) and the width direction (TD), the properties of water vapor transmission rate, oxygen transmission rate, and adhesive strength of the laminate after performing the retort processing or the Gelbo flex test may be rapidly deteriorated.

The shrinkage in the machine direction (MD) and the shrinkage in the width direction (TD) are measured according to the ASTM D 2305 standard for the dimensional change after being left in a hot air oven maintained at 150° C. for 30 minutes, and the shrinkage can be calculated according to the following Equation.

Shrinkage (%)=(Length of the film before heat treatment−Length of the film after maintaining at 150° C. for 30 minutes)/Length of the film before heat treatment×100

The light-transmitting substrate may have a thickness of 5 μm to 300 μm, 5 μm to 250 μm, or 10 μm to 250 μm, or 10 μm to 200 μm, or 10 μm to 150 μm, or 10 μm to 100 μm, or 10 μm to 50 μm. In order to be able to exhibit an appropriate strength as a substrate, the thickness of the light-transmitting substrate is preferably 5 μm or more. However, when the substrate is too thick, the flexibility may be decreased. Therefore, the thickness of the light-transmitting substrate is preferably 300 μm or less.

The light-transmitting substrate may be surface-treated in order to improve its surface wettability or adhesion to the inorganic barrier layer. As a non-limiting example, the surface treatment may be plasma treatment, corona treatment, glow discharge treatment, or the like.

Meanwhile, the inorganic barrier layer is a thin film made of an inorganic material and is laminated on one surface of the light-transmitting substrate.

The inorganic barrier layer may be transparent, and may allow the moisture and oxygen barrier laminate to exhibit moisture and oxygen barrier properties.

Such an inorganic barrier layer may be made of at least one inorganic material selected from the group consisting of silicon oxide, silicon oxynitride, silicon nitride, aluminum oxide, and aluminum nitride.

The inorganic barrier layer may have a thickness of 1 nm to 200 nm, 1 nm to 150 nm, or 5 nm to 150 nm, or 5 nm to 100 nm, or 10 nm to 100 nm. The inorganic barrier layer preferably has a thickness of 1 nm or more in order to exhibit appropriate physical properties as a barrier layer. However, when the inorganic barrier layer is too thick, curl may occur due to stress or even slight bending may cause cracks. Therefore, the thickness of the inorganic barrier layer is preferably 200 nm or less.

The inorganic barrier layer may be formed on the light-transmitting substrate by a conventional method. For example, as a method of laminating the inorganic barrier layer, an appropriate method can be selected from physical vapor deposition (PVD) or chemical vapor deposition (CVD).

Preferably, as a method of laminating the inorganic barrier layer, an evaporation method such as thermal evaporation and electron-beam evaporation; or sputtering may be selected.

As an example, the evaporation method is the most basic method of forming a thin film, and is a method of forming a thin film by heating and evaporating metallic and non-metallic sources and condensing them on the surface of a substrate having a state where temperature is low. According to one embodiment of the present invention, among the evaporation methods, thermal evaporation may be preferably selected as the method of laminating the inorganic barrier layer. The thermal deposition is a deposition method in which a vapor pressure of about $10^{-4}$ torr of an initial vacuum degree is required, electricity is passed through a boat on which a source to be evaporated is placed, and the source is heated using resistance heat generated from the boat. The deposition rate in the thermal deposition may be changed by adjusting the amount of current supplied to the filament. In addition, a reactive gas (oxygen gas) can be added and reacted to form an oxide film ($AlO_x$, $SiO_x$, etc.).

As another example, the sputtering can be preferably used because it has excellent reproducibility and can easily form a dense thin film over a large area. Preferably, reactive sputtering using the inorganic target and reactive oxygen (e.g., oxygen) can be used as a method of laminating the inorganic barrier layer. In the reactive sputtering, the reactive gas is introduced into the system in addition to argon (Ar), which is a plasma generating gas. In the reactive sputtering, devices such as plasma emission monitors, mass flow controllers, etc. are preferably used to precisely control the amount of reactive gas in the system. This is because the stoichiometric ratio of the inorganic thin film to be formed must match. By adjusting the amount of the reaction gas introduced, stable film formation is possible and the inorganic barrier layer having excellent barrier properties can be formed.

Meanwhile, the protective layer is laminated on the inorganic barrier layer. The protective layer can minimize cracking of the inorganic barrier layer or separation between layers due to deformation such as bending.

The protective layer may include at least one resin selected from the group consisting of an alkyd resin, a melamine resin, an acrylic resin, a urethane resin, a polyester resin, a phenol resin, an amino resin, a fluorine resin, an epoxy resin, and an isocyanate resin.

In addition, the protective layer may further include a silane coupling agent capable of improving adhesion to the inorganic barrier layer.

The protective layer may be formed on the inorganic barrier layer by a method conventional in the art.

As an example, a wet coating method may be selected as a method of laminating the protective layer. Specifically, as the wet coating method, a bar coating method, a spin coating method, a roller coating method, a spray coating method, an air knife coating method, a flow coating method, a curtain coating method, a direct gravure method, a slit reverse method, etc. may be applied.

As another example, the protective layer may be laminated on the inorganic barrier layer using an adhesive or an adhesive film.

The protective layer may have a thickness of 1 nm to 1000 nm, 5 nm to 1000 nm, or 5 nm to 800 nm, or 10 nm to 800 nm, or 50 nm to 700 nm, or 100 nm to 700 nm, or 200 nm to 600 nm, or 400 nm to 600 nm. In order to exhibit appropriate physical properties as a protective layer, the thickness of the protective layer is preferably 1 nm or more. However, when the protective layer is too thick, the flexibility may decrease and curl may occur due to stress. Therefore, the thickness of the protective layer is preferably 1000 nm or less.

The moisture and oxygen barrier laminate according to the embodiment may further form at least one film selected from the group consisting of a nylon film and an unstretched polypropylene film on the protective layer.

The nylon film may be a biaxially stretched nylon film, and may supplement the impact resistance of the moisture and oxygen barrier laminate. Further, the unstretched polypropylene film may supplement the heat resistance of the laminate.

For example, the moisture and oxygen barrier laminate is configured such that only an unstretched polypropylene film may be formed on the protective layer, or a nylon film, and an unstretched polypropylene film may be sequentially formed on the protective layer, and bonding between these layers may be formed by bonding with a urethane adhesive or the like.

The moisture and oxygen barrier laminate according to the one embodiment may be used as a food packaging material. In addition, the laminate can be applied to various electronic elements such as liquid crystal display elements, solar electronics, touch panels, organic EL elements, organic TFTs, organic semiconductor sensors, organic light emitting devices, film capacitors, inorganic EL elements, and color filters, or can be used as a packaging material for the electronic devices.

Advantageous Effects

The moisture and oxygen barrier laminate according to the present invention can exhibit excellent moisture and oxygen barrier properties while maintaining excellent interlayer adhesion even after performing a retort process or a Gelbo flex test which sterilizes food at high temperatures.

DETAILED DESCRIPTION OF THE EMBODIMENTS

Preferred embodiments are presented below to facilitate understanding of the invention. However, the following examples are for illustrative purposes only, and the present invention is not limited thereto.

Example 1

(1) Preparation of a Composition for Forming a Protective Layer

A urethane resin (TAKELAC™ WPB-341A, Mitsui Chemicals), pure water, and isopropyl alcohol were mixed in a weight ratio of 30:55:15 to prepare a composition for forming a protective layer.

(2) Preparation of Adhesive

The main component (product name: TM-585-60K, solid content 60 wt. %) which is a polyester-based two-component adhesive, the curing agent component (product name: CAT-10, solid content 75 wt. %), and ethyl acetate were mixed in a weight ratio of 36:4:60 to prepare an adhesive.

(3) Manufacture of Moisture and Oxygen Barrier Laminate

A polyethylene terephthalate (PET1) film of Table 1 below was prepared as a light-transmitting substrate. Aluminum oxide was deposited with a thickness of 10 nm on the PET1 film using a thermal evaporation device equipped with an aluminum target to form an inorganic barrier layer. The composition for forming a protective layer was coated onto the inorganic barrier layer using a Mayer-Bar, so that the dry coating amount was 0.5 g/m$^2$, and then dried at 100° C. for 12 seconds to form a protective layer with a thickness of 500 nm.

The adhesive was coated to a thickness of 3 μm onto the protective layer, and then dried at 100° C. for 20 seconds, and a nylon film (CNH-02, KOLON Industries) having a thickness of 15 μm was laminated on the dried adhesive-coated surface using a laminator. The adhesive was coated to a thickness of 3 μm onto the nylon film, and then dried at 100° C. for 20 seconds, and an unstretched polypropylene (CPR-HS, Filmax Corp.) film having a thickness of 70 μm was laminated on the dried adhesive-coated surface using a laminator to manufacture a moisture and oxygen barrier laminate.

Comparative Examples 1 to 3

A moisture and oxygen barrier laminate was manufactured in the same manner as in Example 1, except that one of the PET2 to PET4 films in Table 1 below was used instead of the PET1 film.

On the other hand, the methods for measuring the shrinkage and the in-plane retardation (Re) in Table 1 below are as follows.

(a) Measurement of Shrinkage

The shrinkage in the machine direction (MD) and the shrinkage in the width direction (TD) of the polyethylene terephthalate (PET) films used in each of Examples and Comparative Examples were measured according to the ASTM D 2305 standard.

Specifically, the polyethylene terephthalate film was cut into a standard of 200 mm in width and 200 mm in length, and then the dimensional change after being left in a hot air oven maintained at 150° C. for 30 minutes was measured.

Shrinkage (%)=(Length of the film before heat treatment−Length of the film after maintaining at 150° C. for 30 minutes)/Length of the film before heat treatment×100

(b) Measurement of Retardation

From the polyethylene terephthalate (PET) film used in each of Examples and Comparative Examples, a band-shaped test piece having a length of 50 mm in a machine direction (MD)×a length in the width direction (TD) was cut out. Then, in-plane retardation (Re) and thickness direction retardation ($R_{th}$) at 590 nm at 10 measurement points with intervals of 100 mm in the width direction were respectively measured using a parallel Nicol rotation retardation measuring instrument (Oji Scientific Instruments, KOBRA-WPR, Japan), and the average and standard deviation of the in-plane retardation (Re) and the retardation ($R_{th}$) in the thickness direction were calculated.

TABLE 1

|  |  | Example 1 | Comparative Example 1 | Comparative Example 2 | Comparative Example 3 |
|---|---|---|---|---|---|
| PET film (thickness) |  | PET1 (12 μm) | PET2 (12 μm) | PET3 (12 μm) | PET4 (12 μm) |
| Shrinkage (%) | Machine direction (MD) | 1.2 | 1.4 | 1.2 | 1.3 |
|  | Width direction (TD) | 0.0 | 1.3 | -0.2 | -0.2 |
| Retardation (Re, nm) | n = 1 | 170.3 | 110.5 | 394.4 | 523.9 |
|  | n = 2 | 165.6 | 106.1 | 383.8 | 514.9 |
|  | n = 3 | 159.4 | 97.7 | 412.9 | 513.5 |
|  | n = 4 | 169.1 | 99.1 | 412.5 | 533.6 |
|  | n = 5 | 162.0 | 106.7 | 419.6 | 548.2 |
|  | n = 6 | 186.7 | 101.1 | 401.1 | 541.7 |
|  | n = 7 | 188.9 | 100.4 | 398.9 | 528.9 |
|  | n = 8 | 185.3 | 104.9 | 398.3 | 522.5 |
|  | n = 9 | 177.0 | 107.0 | 388.9 | 531.6 |
|  | n = 10 | 170.6 | 88.4 | 417.9 | 534.2 |
|  | Average | 173.5 | 102.2 | 402.8 | 529.3 |
|  | Standard deviation | 10.0 | 6.0 | 11.7 | 10.4 |
| Retardation ($R_{th}$, nm) | n = 1 | 481.9 | 312.7 | 1116.2 | 1482.6 |
|  | n = 2 | 467.0 | 299.2 | 1082.3 | 1452.0 |
|  | n = 3 | 452.7 | 277.5 | 1172.6 | 1458.3 |
|  | n = 4 | 481.9 | 282.4 | 1175.6 | 1520.8 |
|  | n = 5 | 456.8 | 300.9 | 1183.3 | 1545.9 |
|  | n = 6 | 528.4 | 286.1 | 1135.1 | 1533.0 |
|  | n = 7 | 536.5 | 285.1 | 1132.9 | 1502.1 |
|  | n = 8 | 526.3 | 297.9 | 1131.2 | 1483.9 |
|  | n = 9 | 497.4 | 300.7 | 1092.8 | 1493.8 |
|  | n = 10 | 486.2 | 251.9 | 1191.0 | 1522.5 |
|  | Average | 491.5 | 289.4 | 1141.3 | 1499.5 |
|  | Standard deviation | 28.6 | 16.1 | 36.1 | 29.6 |

Test Example (1) Evaluation of Water Vapor Transmission Rate 50 cm² of the moisture and oxygen barrier laminates of Examples and Comparative Examples was mounted in water vapor permeation analyzer (model name: AQUATRAN 2 WVTR Analyzer, manufacturer: Mocon Inc.), and then the water vapor transmission rate (g/m²*day) was measured under conditions of 40° C. and 90% relative humidity according to the standard test method of ASTM F1249.

(2) Evaluation of Oxygen Vapor Transmission Rate 50 cm² of the moisture and oxygen barrier laminates of Examples and Comparative Examples were mounted in an oxygen permeation analyzer (model name: OX-Tran 2/21 OTR Analyzer, manufacturer: Mocon Inc.), and then the oxygen transmission rate (cc/m²*day) was measured under conditions of 23° C. and 0% relative humidity according to the standard test method of ASTM D3985.

(3) Evaluation of Adhesive Strength

In the moisture and oxygen barrier laminates of Examples and Comparative Examples, an adhesive was dry-coated to a thickness of 3 μm on the protective layer on which the nylon film and the unstretched polypropylene film were not formed, and then only the unstretched polypropylene film was laminated thereon and aged at 45° C. for 1 day to prepare a test sample.

Two sheets of double-sided tapes were attached onto the measuring plate of a peel tester (model name: AR-1000, manufacturer: Chem Instruments), to which the test sample cut to 1.5 cm in width was attached, and a 180° peel test was performed according to the standard test method of ASTM D3330 to obtain an adhesive strength (gf/15 mm).

(4) Evaluation of Water Vapor Transmission Rate, Oxygen Transmission Rate and Adhesive Strength after Retort Processing The moisture and oxygen barrier laminates of Examples and Comparative Examples were subjected to retort processing. Specifically, the laminates were sterilized at 135° C. for 1 hour using a retort evaluation equipment (PRS-03-IH, Kyunghan Co., Ltd.).

Subsequently, the moisture and oxygen barrier laminates subjected to retort processing were recovered, and the (1) water vapor transmission rate evaluation, (2) oxygen transmission rate evaluation, and (3) adhesive strength evaluation were performed and evaluated again.

(5) Evaluation of Water Vapor Transmission Rate and Oxygen Transmission Rate after Gelbo Flex Test The moisture and oxygen barrier laminates of Examples and Comparative Examples were subjected to the Gelbo flex test. Specifically, the test was performed according to the standard test method of ASTM F392 using a Gelbo flex tester (model name: G0005, manufacturer: IDM Instruments), and the moisture and oxygen barrier laminates were attached to the mandrels of the Gelbo flex tester, the test setup gave a twisting motion of 440° in the first 90 mm of the stroke, and was followed by a straight horizontal motion of 65 mm. At this time, the speed of the bending motion was set to 50 cycles per minute.

Subsequently, the moisture and oxygen barrier laminates of Examples and Comparative Examples subjected to the Gelbo flex test were recovered and the (1) (1) water vapor transmission rate evaluation and (2) oxygen transmission rate evaluation were performed and evaluated again.

TABLE 2

|  |  | Example 1 | Comparative Example 1 | Comparative Example 2 | Comparative Example 3 |
|---|---|---|---|---|---|
| water vapor transmission rate (WVTR, g/m²*day) | initial | 0.64 | 0.69 | 1.01 | 1.15 |
|  | After retro processing | 1.02 | 2.18 | 2.57 | 2.62 |
|  | After Gelbo flex test | 1.26 | 1.31 | 2.05 | 2.11 |
| oxygen transmission rate (OTR, cc/m²*day) | Initial | 0.19 | 0.14 | 0.52 | 0.60 |
|  | After retro processing | 0.41 | 0.59 | 1.13 | 1.07 |
|  | After Gelbo flex test | 0.81 | 1.16 | 1.82 | 1.77 |
| adhesive strength (gf/15 mm) | Initial | 880.6 | 848.1 | 780.2 | 813.2 |
|  | After retro processing | 468.6 | 377.0 | 305.4 | 287.8 |

Referring to Table 2, it was confirmed that the moisture and oxygen barrier laminates of Examples exhibited remarkable small changes in water vapor transmission rate, oxygen transmission rate and adhesive strength before and after the retort processing and the Gelbo flex test, while being excellent in initial moisture barrier property, oxygen barrier property and adhesive strength.

In contrast, it was confirmed that in the case of the moisture and oxygen barrier laminates of Comparative Examples, not only the initial moisture barrier properties, oxygen barrier properties, and adhesive strength were inferior to those of Examples, but also the properties rapidly deteriorated even after retort processing and Gelbo flex test.

What is claimed is:

1. A moisture and oxygen barrier laminate, comprising:
   an inorganic barrier layer and a protective layer sequentially formed on one surface of a light-transmitting substrate,
   wherein the light-transmitting substrate is a polyethylene terephthalate film,
   wherein the change in water vapor transmission rate (WVTR) before and after 50 cycles of repeated twisting of the laminate using a Gelbo flex tester is 0.70 g/m²*day or less, and
   wherein the change in water vapor transmission rate (WVTR) before and after retort processing at a temperature of 135° C. for 1 hour is 1.00 g/m²*day or less.

2. The moisture and oxygen barrier laminate according to claim 1, wherein:
   the change in oxygen transmission rate (OTR) before and after retort processing of the laminate at a temperature of 135° C. for 1 hour is 0.50 cc/m²*day or less.

3. The moisture and oxygen barrier laminate according to claim 1, wherein:
   the change in oxygen transmission rate (OTR) before and after 50 cycles of repeated twisting of the laminate using a Gelbo flex tester is 1.00 cc/m²*day or less.

4. The moisture and oxygen barrier laminate according to claim 1, wherein:
   the polyethylene terephthalate film has an in-plane retardation (Re) value of 120 to 300 nm.

5. The moisture and oxygen barrier laminate according to claim 1, wherein:
   the polyethylene terephthalate film has a thickness direction retardation ($R_{th}$) value of 100 nm or more and 1,000 nm or less.

6. The moisture and oxygen barrier laminate according to claim 1, wherein:
   the average value of in-plane retardation (Re) obtained by measuring the polyethylene terephthalate film with an interval of 100 mm in the width direction is 120 to 300 nm, and the standard deviation is 7.0 to 15.0.

7. The moisture and oxygen barrier laminate according to claim 1, wherein:
   a difference ($n_x-n_y$) between the refractive index ($n_x$) of the polyethylene terephthalate film in the in-plane slow axis direction and the refractive index ($n_y$) in the in-plane fast axis direction is 0.010 to 0.030.

8. The moisture and oxygen barrier laminate according to claim 1, wherein:
   the shrinkage in the machine direction (MD), which is measured according to the ASTM D 2305 standard after maintaining the polyethylene terephthalate film at 150° C. for 30 minutes, is 0.5% to 2.0%, and the shrinkage in the width direction (TD) is 0.0% to 1.0%.

9. The moisture and oxygen barrier laminate according to claim 1, wherein:
   at least one film selected from the group consisting of a nylon film and an unstretched polypropylene film is further formed on the protective layer.

10. The moisture and oxygen barrier laminate according to claim 1, wherein:
    the inorganic barrier layer is made of at least one inorganic material selected from the group consisting of silicon oxide, silicon oxynitride, silicon nitride, aluminum oxide, and aluminum nitride.

11. The moisture and oxygen barrier laminate according to claim 1, wherein:
    the protective layer comprises at least one resin selected from the group consisting of an alkyd resin, a melamine resin, an acrylic resin, a urethane resin, a polyester resin, a phenol resin, an amino resin, a fluorine resin, an epoxy resin, and an isocyanate resin.

12. The moisture and oxygen barrier laminate according to claim 1, wherein:
    the light-transmitting substrate has a thickness of 5 μm to 100 μm.

13. The moisture and oxygen barrier laminate according to claim 1, wherein:
    the inorganic barrier layer has a thickness of 1 nm to 200 nm.

14. The moisture and oxygen barrier laminate according to claim 1, wherein:
    the protective layer has a thickness of 1 nm to 1000 nm.

* * * * *